Feb. 23, 1960   G. M. R. WINKLER   2,926,310
AUTOMATIC TUNING SYSTEM
Filed Feb. 19, 1958

*INVENTOR,*
GERNOT M. R. WINKLER
BY
Harry M. Saragovitz
ATTORNEY.

United States Patent Office

2,926,310
Patented Feb. 23, 1960

2,926,310

AUTOMATIC TUNING SYSTEM

Gernot M. R. Winkler, Long Branch, N.J., assignor to the United States of America as represented by the Secretary of the Army Application February 19, 1958, Serial No. 716,246

4 Claims. (Cl. 331—2)

(Granted under Title 35, U.S. Code (1952), sec. 266)

The invention described herein may be manufactured and used by or for the Government for governmental purposes, without the payment of any royalty thereon.

My invention relates to automatic tuning systems for microwave oscillators and particularly to systems for automatically tuning the resonant cavity of a molecular or atomic oscillator, or more generally, of a quantum mechanical oscillator. In such an oscillator the output frequency is determined by the frequency of the energy emitted by molecular or submolecular particles during transitions from a higher to a lower energy state. This frequency is called the transition frequency.

In one such oscillator, known as the maser, a stream of gas molecules, such as ammonia, is passed into a resonant cavity which must be tuned as close as possible to the transition frequency. In the past, continuous operation of a maser was inhibited by the pulling effects of a detuned cavity, caused by slight temperature changes, or by residual changes due to materials deposited within the cavity, or aging or other after effects of heavy shock or vibration, or residual changes in dimensions after baking out the vacuum system.

A detuned cavity not only decreases the output power, but it also tends to pull the maser frequency in accordance with the formula: $\Delta F_m = K \Delta F_c Q_c / Q_1$, where $\Delta F_m$ is the shift in the maser frequency, K is a constant, $\Delta F_c$ is the extent of detuning of the cavity, $Q_c$ is the Q of the cavity, and $Q_1$ is the Q of the line, which is equal to the transition frequency of the undisturbed particles divided by the half power line width.

It will be seen from the above equation that when the cavity is properly tuned, i.e., if $\Delta F_c$ is zero, $\Delta F_m$ will be zero regardless of the variation of either of the Q factors. However, when the cavity is detuned, any variation of these factors will cause a frequency shift of the oscillator.

In the past, variations in the cavity tuning have been reduced by maintaining a constant temperature, but this is extremely difficult and cumbersome since the temperature must be maintained constant within extremely close limits. Besides, this form of control does not compensate for the effects of material deposited in the cavity during operation and the effects of shock and vibration, or from long period mechanical changes. Other suggested methods involve the use of a second maser as a reference oscillator.

It is a principal object of the invention to provide an automatic tuning control which will correct mistuning of the cavity resonator of a quantum mechanical oscillator which may be caused by all of the above mentioned factors and which is relatively simple and less expensive than prior methods.

In accordance with one aspect of the invention, any of the parameters of the above equation is varied periodically in any known manner, whereby any detuning of the cavity from the transition frequency will cause frequency modulation of the oscillator output. The modulation component is then detected and used to control the actuation of a cavity tuning element, which will retune the cavity until the extent of frequency modulation is at a minimum, at which time the amount of cavity detuning is also a minimum.

In accordance with another aspect of my invention, the modulation detection network is made more sensitive by using a second oscillator which is phase locked to the main oscillator, by means of a phase lock system actuated by both oscillators. The phase lock system incorporates a phase modulation detector which will yield a tuning-error-dependent output which is used, firstly, to maintain the second-oscillator phase locked, i.e., coherent in phase, with the output of the main oscillator, and secondly, to derive a second tuning-error-dependent output which is used to retune the cavity until the extent of frequency modulation of the main oscillator output is minimized.

The features of the invention which are believed to be novel are set forth with particularity in the appended claims. The invention itself, however, both as to its organization and method of operation, together with further objects and advantages thereof, may best be understood by reference to the following description taken in conjunction with the accompanying drawing, in which:

Figure 1:
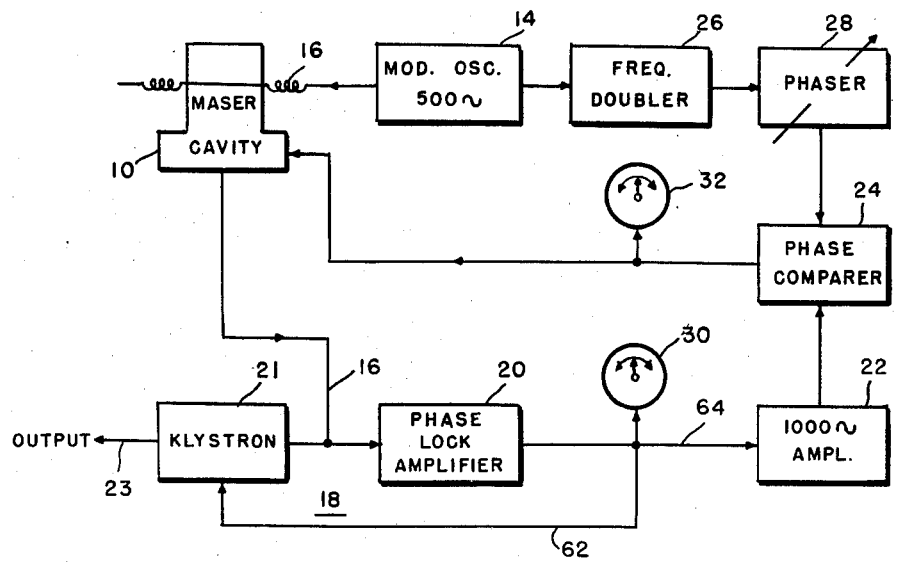
Figure 1 is a block diagram of the invention.

In Figure 1, there is shown a maser 10, incorporating therein a cavity resonator. To detect any mistuning of the cavity resonator, one or more of the Q factors of the cavity or other portions of the oscillator is periodically modulated at a relatively low frequency by any of the conventional methods. Examples of such methods are variation of the electric field on the gas, i.e., by the Stark effect, and variation of the magnetic field, i.e., by the Zeeman effect. The latter method is illustrated herein and involves the use of a modulating oscillator 14 operating at a low frequency, say 500 cycles per second. The output of this oscillator is applied to the Zeeman modulating coils 16 associated with the maser. This will produce a frequency modulation of the maser output if the cavity is detuned from the molecular transition frequency. Since this modulation is not dependent to a great extent on the direction of the magnetic field, a reversal of this field when the modulating current reverses will produce frequency modulation in the same direction. Hence the maser output will be frequency modulated predominantly at double the frequency of modulating oscillator 14, i.e., at 1000 cycles per second. Other modulation frequency components appear in the maser output, but the strongest of them will be the double frequency component which is utilized herein.

In accordance with the invention herein, the frequency modulated wave is applied, through a line 17, to a phase sensitive detector system 18, comprising elements 20 and 21, which demodulates the frequency modulated wave to derive the 1000 cycle modulation component. Because of the phase detection process, the amount of phase displacement of the detected 1000 cycle current relative to the phase of the modulation cycle, is dependent upon the amount of detuning of the maser cavity from the transition frequency, while the sign of this phase displacement is dependent upon the direction of said detuning.

This 1000 cycle signal is now amplified in the narrow band amplifier 22, tuned to 1000 cycles, and compared with another 1000 cycle signal of fixed reference phase in a conventional balanced phase comparing circuit 24. The fixed reference phase signal is derived from the 500 cycle modulating oscillator 14 by passing the output of the latter through a frequency doubler 26 and then through a phase adjusting network 28 to phase detector 24. The phase adjusting network is adjusted so that its output is 90° phase displaced relative to the phase of the output of amplifier 22 when the extent of detuning of the maser cavity is a zero. Under such conditions, the output of phase comparing circuit 24 will be a direct current voltage which will be zero when the maser cavity is properly tuned. When the cavity is detuned, the output will have a polarity which is dependent upon the direction of detuning, and a magnitude which is dependent upon the extent of said detuning. This voltage is now applied to a conventional voltage or current-controlled cavity tuning means, such as a servo motor, or a thermostatic element, or a ferrite element in the cavity, whereby the cavity will be retuned to the proper direction, in a manner well known in the art, until the error voltage in the output of phase-comparing circuit 24 is zero or minimum, at which time the detuning of the cavity is minimum.

Although, in its broad aspects, the invention herein is not restricted for use with a specific form of phase-sensitive detector system, the type of system constituted by circuit 18 is of particular advantage. This circuit comprises a voltage-tunable auxiliary oscillator, such as a klystron 21, the output of which is heterodyned in component 20 with the maser output to provide a stronger lower frequency signal. This lower frequency signal contains all the frequency modulation products of the maser output. This stronger signal is amplified and applied to a phase modulation detector which not only supplies the 1000 cycle modulation component above mentioned, but also a unidirectional, error-dependent voltage component, i.e., a voltage dependent upon the displacement of the maser output caused by the detuned cavity in the absence of modulation. Both components are applied to the klystron to maintain it phase locked with the maser output.

Circuit 18 is essentially that shown in Figure 5 of the paper of Peter and Strandberg, "Phase Stabilization of Microwave Oscillators," Proc. I.R.E., July 1955, pp. 869–873. Any other type of phase-lock system may be used.

Figure 2:
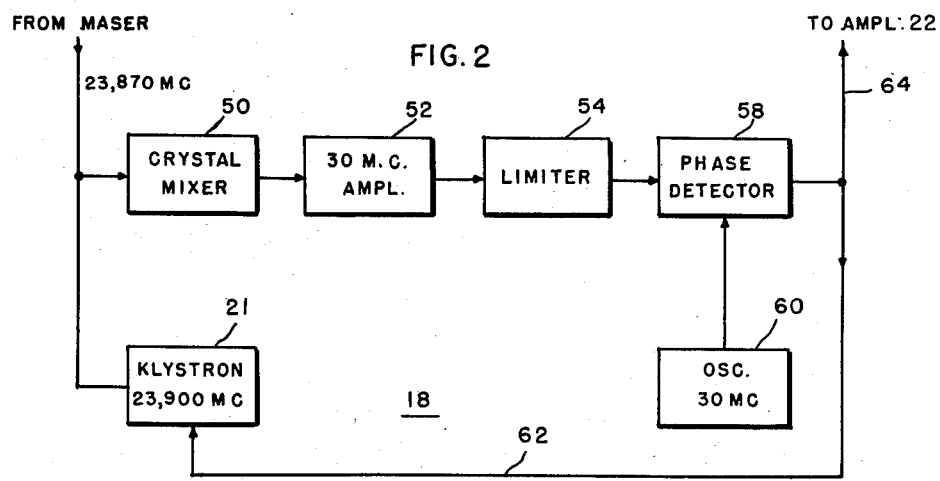
Figure 2 is a block diagram of a component in Figure 1.

Figure 2 shows a more detailed diagram of the phase-lock amplifier 20. The 23,870 megacycle output of the maser is heterodyned with the 23,900 megacycle output of klystron oscillator 21 in a crystal mixer 50. The difference-frequency of 30 megacycles in the output of the mixer is amplified in the 30 megacycle amplifier 52 and then preferably limited in amplitude in a limiter 54. The output of the limiter is now applied to a phase detector 58 to which is also applied a 30 megacycle reference oscillation from a stable oscillator 60, which may be of the crystal controlled type. The output of detector 58 will have several components. One component is a unidirectional voltage having an amplitude dependent upon the extent of departure of the klystron frequency from one in which it is phase-locked with maser output, and a polarity which is dependent upon the direction of said departure. The other component is superimposed upon the first component and consists of the 1000 cycle modulation component previously discussed. Both components are applied through a line 62 to a frequency controlling electrode, such as the repeller, of the klystron and will vary the frequency of the latter until it is phase-locked with the maser output. Said output is also applied through a lead 64 to the 1000 cycle amplifier 24, as previously described. For a more detailed discussion of the operation of circuit 18, reference is made to the Peter and Strandberg paper, supra.

Zero-center voltmeters 30 and 32 measure the error voltages to monitor the operation of the system. When the system is operating properly, the error voltages as indicated by the voltmeters should be substantially zero or minimum.

The stabilized output of the system can be supplied from the klystron through a line 23 to a utilization circuit.

The use of the phase locked oscillator system serves to enhance the power of the signal supplied to the error detector and to prestabilize this signal, and it also increases the percentage frequency deviation of this signal, so that detection of the relatively small frequency modulation component of the maser output yields a stronger tuning correction signal. It is to be understood that the various operating frequencies are merely illustrative. Other frequencies can be used.

While there has been described what is at present considered a preferred embodiment of the invention, it will be obvious to those skilled in the art that various changes and modifications may be made therein without departing from the invention; and it is aimed in the appended claims to cover all such changes and modifications as fall within the true spirit and scope of the invention.

What is claimed is:

1. In an automatic frequency control system for a quantum mechanical oscillator having a microwave resonator which must be tuned to the transition frequency of said oscillator, tuning correction means acting on said resonator to correct for any detuning of said resonator, said tuning correction means comprising means in circuit with said oscillator for producing a wave length modulation of its output when said resonator is detuned, and means energized by said output and responsive to the modulation component thereof for retuning said resonator until said modulation component is minimized, the last named means comprising a second oscillator and a phase-sensitive detector energized by the product of both oscillators to provide an error output dependent upon the phase relation of said oscillators and means responsive to said error output for maintaining said second oscillator phase locked with the first oscillator and for retuning said resonator until said wave length modulation is minimized.

2. A frequency control system for a quantum mechanical oscillator having a microwave resonator which must be tuned close to the transition frequency of the particles which control the frequency of said oscillator, means acting on said particles for modulating the output frequency of said oscillator at a relatively low modulation frequency when said resonator is detuned, an auxiliary oscillator, a phase detector network energized by the outputs of said oscillators for deriving an error output having a frequency harmonically related to said modulation frequency and a phase displacement having a sign and extent which are respectively dependent upon the sign and extent of the departure from a condition of phase coherence of said oscillators, means responsive to said error output for maintaining the auxiliary oscillator in phase coherence with said quantum mechanical oscillator, and additional means controlled by said error signal to vary the tuning of said cavity until the modulation of said output frequency is minimized.

3. In a frequency control system for a quantum mechanical oscillator having a microwave cavity resonator which must be tuned close to the transition frequency of the particles which control the output frequency, periodic modulating means acting on said particles for modulating the output frequency of said oscillator at a relatively low modulation frequency when said resonator is detuned, an auxiliary source of oscillations, a phase detector network energized by the outputs of said oscillator and said source for deriving an error output representative of the amount and direction of detuning of said resonator and representative of the extent and direction of departure of the phase of said auxiliary source oscillations from a condition of phase lock with the output of said oscillator, means responsive to said error output for phase locking said auxiliary source with the output of said oscillator, and a second means responsive to said error output and said modulating means to reduce the amount of detuning of said cavity.

4. A frequency control system for a maser oscillator having a microwave cavity resonator which must be tuned close to the transition frequency, a source of modulating oscillations for modulating the output frequency of said maser at a frequency which is double that of said oscillations, a tunable auxiliary oscillator having a frequency which is different from said maser frequency, means for heterodyning the outputs of said oscillators to provide a difference beat frequency, a phase detector network energized by said beat frequency for deriving an error output having a frequency equal to said double frequency and a phase and amplitude which are respectively dependent upon the direction and magnitude of the detuning of said cavity resonator from said transition frequency, means responsive to said error output for retuning said auxiliary oscillator until it is in phase coherence with the output of said maser oscillator, a frequency doubler coupled to said source of modulating oscillations, phase comparing means responsive to said error signal and the output of said doubler for deriving a second error signal, and means responsive to said second error signal for retuning said resonator until the frequency modulation of the maser output is minimized.

References Cited in the file of this patent

UNITED STATES PATENTS

| | | |
|---|---|---|
| 2,564,005 | Halpern et al. | Aug. 14, 1951 |
| 2,564,059 | Gensel | Aug. 14, 1951 |
| 2,692,947 | Spencer | Oct. 26, 1954 |
| 2,754,420 | Ratcliffe | July 10, 1956 |
| 2,807,721 | Norton | Sept. 24, 1957 |